(12) United States Patent
Huang et al.

(10) Patent No.: US 12,294,296 B2
(45) Date of Patent: May 6, 2025

(54) TOTEM POLE POWER FACTOR CORRECTION CIRCUIT AND METHOD OF OPERATING THE SAME

(71) Applicant: DELTA ELECTRONICS, INC., Taoyuan (TW)

(72) Inventors: Chun-Hao Huang, Taoyuan (TW); Chun-Wei Lin, Taoyuan (TW); I-Hsiang Shih, Taoyuan (TW); Ching-Nan Wu, Taoyuan (TW); Jia-Wei Yeh, Taoyuan (TW)

(73) Assignee: DELTA ELECTRONICS, INC., Taoyuan (TW)

( * ) Notice: Subject to any disclaimer, the term of this patent is extended or adjusted under 35 U.S.C. 154(b) by 275 days.

(21) Appl. No.: 18/112,733

(22) Filed: Feb. 22, 2023

(65) Prior Publication Data
US 2024/0113615 A1    Apr. 4, 2024

(30) Foreign Application Priority Data
Sep. 30, 2022   (CN) .......................... 202211206638.1

(51) Int. Cl.
*H02M 1/42* (2007.01)
*H02M 1/00* (2006.01)

(52) U.S. Cl.
CPC ....... *H02M 1/4216* (2013.01); *H02M 1/0009* (2021.05); *H02M 1/4233* (2013.01)

(58) Field of Classification Search
CPC . H02M 1/0009; H02M 1/4216; H02M 1/4233
See application file for complete search history.

(56) References Cited

U.S. PATENT DOCUMENTS

| 5,021,936 A | 6/1991 | Nishizawa et al. |
| 2021/0296982 A1* | 9/2021 | Hafezinasab ....... H02M 3/1582 |

(Continued)

FOREIGN PATENT DOCUMENTS

| CN | 114285261 A | 4/2022 |
| WO | 2021213676 A1 | 10/2021 |

OTHER PUBLICATIONS

Office Action dated May 2, 2023 of the corresponding Taiwan patent application No. 111137170.

(Continued)

*Primary Examiner* — Jue Zhang
*Assistant Examiner* — Lakaisha Jackson
(74) *Attorney, Agent, or Firm* — MUNCY, GEISSLER, OLDS & LOWE, P.C.

(57) ABSTRACT

A Totem Pole PFC circuit includes at least one fast-switching leg, a slow-switching leg, and a control unit. Each fast-switching leg includes a fast-switching upper switch and a fast-switching lower switch. The slow-switching leg is coupled in parallel to the at least one fast-switching leg, and the slow-switching leg includes a slow-switching upper switch and a slow-switching lower switch. The control unit receives an AC voltage with a phase angle, and the control unit includes a current detection loop, a voltage detection loop, and a control loop. The control loop generates a second control signal assembly to respectively control the slow-switching upper switch and the slow-switching lower switch. The control loop controls the second control signal assembly to follow the phase angle, and dynamically adjusts a duty cycle of the second control signal assembly to turn on or turn off the slow-switching upper switch and the slow-switching lower switch.

15 Claims, 8 Drawing Sheets

(56) References Cited

U.S. PATENT DOCUMENTS

2022/0052620 A1* 2/2022 Du .................... H02M 1/0043
2022/0077769 A1* 3/2022 Cai ...................... H02M 7/23
2022/0209652 A1* 6/2022 Kim .................. H02M 1/4233

OTHER PUBLICATIONS

Vinit Kumar et al: "Single-Phase, Bidirectional, 7.7 kw Totem Pole On-Board Charging/Discharging Infrastructure", Applied Sciences, vol. 12, No. 4, Feb. 21, 2022, pp. 2236, Figs. 2, 6.
Search Report dated Aug. 22, 2023 of the corresponding European patent application No. 23157205.8.

* cited by examiner

FIG.8

TOTEM POLE POWER FACTOR CORRECTION CIRCUIT AND METHOD OF OPERATING THE SAME

BACKGROUND

Technical Field

The present disclosure relates to a Totem Pole power factor correction circuit and a method of operating the same, and more particularly to a Totem Pole power factor correction circuit and a method of operating the same for dynamically adjusting a duty cycle of a control signal assembly of controlling slow-switching switches to follow a phase angle of an AC voltage.

Description of Related Art

The statements in this section merely provide background information related to the present disclosure and do not necessarily constitute prior art.

With the rising awareness of environmental protection and green energy, under the trend of doubling the sales of electric vehicles and the increasing demand for the construction of charging stations, how to charge and store electricity will face the power supply dilemma. If large-scale electricity is needed in the future when the regional power supply is in crisis, the electricity can be dispatched immediately and sent back to the regional power grid. That is, through the electric vehicle with discharge function, plug in the bidirectional charging and discharging equipment, and the vehicle power can be returned to the high-power energy storage cabinet to provide V2X (Vehicle to Grid, Load, Home, and/or Vehicle) function. It will become the mainstream design of electric vehicles combined with smart grid operation, and it will also be one of the main options for electric vehicle consumers to purchase electric vehicles in the future.

In general, the power flow of the V2G system can be divided into two types: unidirectional and bidirectional systems. The device used to control the charging rate by the unidirectional V2G technology has many disadvantages and limitations, such as virtual power support, peak load shaving and valley filling, frequency adjustment, voltage regulation, etc. Bidirectional V2G battery chargers for electric vehicles include DC-to-DC (DC/DC) converters and AC-to-DC (AC/DC) converters, and the main advantages are reactive power and real power support, renewable energy deployment, avoiding grid overload, fault recovery, reducing grid losses, power factor adjustment, etc. Through these functions, the bidirectional V2G system can provide more possibilities for grid operations. In the bidirectional V2G system, electric vehicles can also play the role of energy supply and storage, which can moderately solve the problems caused by the instability of renewable energy.

Totem Pole circuit is a common architecture for single-phase charging, and also a common architecture for power factor correction (PFC) circuits. The architecture uses transistor switches $Q_A$, $Q_B$ as slow-switching leg switches and transistor switches $Q_1$, $Q_2$ as fast-switching leg switches. In particular, the slow-switching leg switches (transistor switches $Q_A$, $Q_B$) are controlled according to the mains frequency, while the fast-switching leg switches (transistor switches $Q_1$, $Q_2$) are controlled at high frequency according to the switching frequency.

Figure 1A:
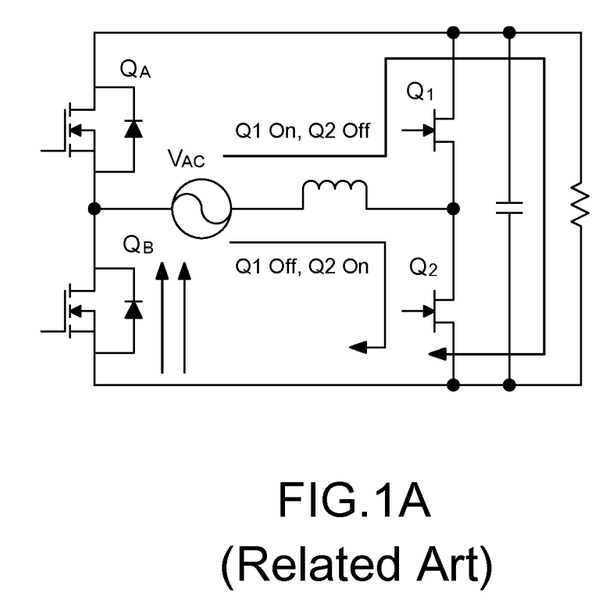
FIG. 1A is a circuit diagram of a conventional Totem Pole circuit under a unidirectional charging mode.
Figure 1B:
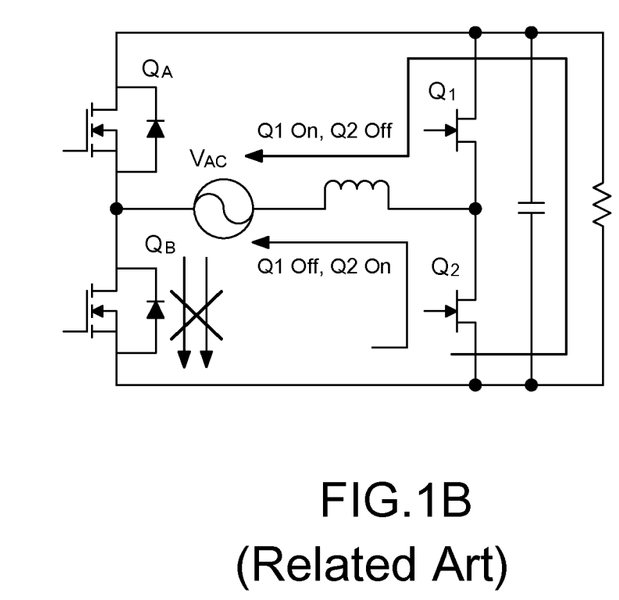
FIG. 1B is a circuit diagram of the conventional Totem Pole circuit under a unidirectional discharging mode.

Please refer to FIG. 1A and FIG. 1B, which respectively show a circuit diagram of a conventional Totem Pole circuit under a unidirectional charging mode and a unidirectional discharging mode. The general charging mode operation is shown in FIG. 1A. In this condition, the AC voltage $V_{AC}$ is the input voltage. When the AC voltage $V_{AC}$ is in a positive half-wave, the slow-switching transistor switch $Q_B$ will be turned on, and the transistor switches $Q_1$, $Q_2$ will be fast switched according to the current duty cycle. If the transistor switch $Q_B$ is turned on later due to voltage offset or other factors, in this charging mode, the current may still flow through the bypass diode of the transistor switch $Q_B$.

In the discharging mode as shown in FIG. 1B, the AC voltage $V_{AC}$ is the output voltage. When the AC voltage $V_{AC}$ is in a positive half-wave, the bypass diode will be turned off so that the current cannot continue to flow if the transistor switch $Q_B$ is turned on later due to voltage offset or other factors.

Due to the above-mentioned discharging mode, the bypass diode of the transistor switch $Q_B$ will have a current cut-off problem. Generally, when electric vehicle products are used in V2L, V2G and other discharging modes, there will be applications of voltage and current angular shift due to inductive and/or capacitive devices, as well as the reactive power demand of mains. Therefore, the general Totem Pole circuit architecture can only be applied in the charging mode, but cannot meet the load requirements in the discharging mode.

Take the generation of applications that require single-phase bidirectional (charging and discharging modes) functions as an example. Due to the X-capacitor (X-cap) on the EMC circuit of the applied product, it is equivalent to a capacitive load under a no-load condition. In this condition, the Totem Pole converted controlled in a standard way will make the turned-on time of the slow-switching transistor switch $Q_B$ delay, resulting in a discontinuous current cut-off. Practically applied to electric vehicle products, operating in V2G, V2L conditions, there will be the same situation under the inductive or capacitive loads. The occurrence of the above-mentioned situation, in addition to the damage to the AC load, will also cause serious power quality impact under the V2G operation conditions of the corresponding power grid.

Figure 2:
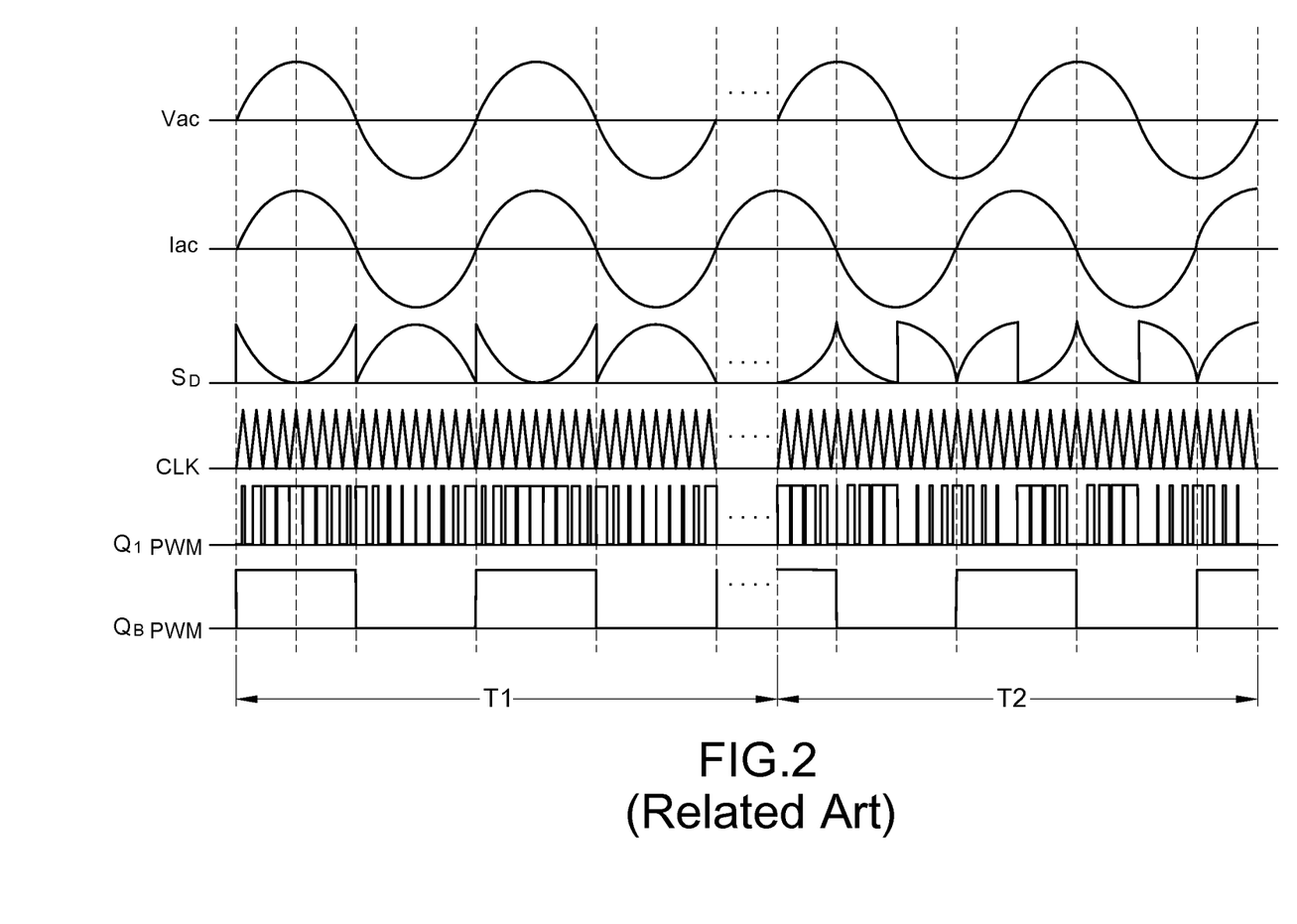
FIG. 2 is a waveform of control signals of controlling the conventional Totem Pole circuit.

Please refer to FIG. 2, which shows a waveform of control signals of controlling the conventional Totem Pole circuit. Take the V2L mode control as an example, under normal operation, that is, when the load does not cause a voltage offset, the Totem Pole circuit is the standard control signal (as shown in the interval T1 in FIG. 1). However, when the output AC voltage $V_{AC}$ is phase shifted due to the influence of the inductive or capacitive load as shown in FIG. 2, from the interval T1 to the interval T2, that is, the output AC voltage $V_{AC}$ is no longer continuous, the actual output control quantity SD of the controller and a control signal $Q_B$ PWM of the slow-switching transistor switch $Q_B$ will be distorted due to the change of the reference angle and the normal control behavior is affected, resulting in the inability to output (transmit) normal energy to the AC side. Even when operating in a heavy-load state, it is easy to cause system shutdown due to triggering over-current protection (OCP) or over-voltage protection (OVP).

SUMMARY

An objective of the present disclosure is to provide a Totem Pole power factor correction circuit to solve the problems of existing technology.

In order to achieve the above-mentioned objective, the preset disclosure provides a Totem Pole power factor correction circuit. When the Totem Pole power factor correction circuit converts a DC power to an AC power, the Totem Pole power factor correction circuit includes at least one fast-switching leg, a slow-switching leg, and a control unit. Each fast-switching leg includes a fast-switching upper switch and a fast-switching lower switch. The slow-switching leg is coupled to the at least one fast-switching leg in parallel, and the slow-switching leg includes a slow-switching upper switch and a slow-switching lower switch. The control unit receives an AC voltage with a phase angle, and the control unit includes a current detection loop, a voltage detection loop, and a control loop. The current detection loop receives the phase angle. The voltage detection loop receives the phase angle. The control loop is coupled to the current detection loop and the voltage detection loop, and the control loop generates a first control signal assembly with complementary levels to respectively control the fast-switching upper switch and the fast-switching lower switch, and generates a second control signal assembly with complementary levels to respectively control the slow-switching upper switch and the slow-switching lower switch. The control loop controls the second control signal assembly to follow the phase angle, and dynamically adjusts a duty cycle of the second control signal assembly to respectively turn on or turn off the slow-switching upper switch and the slow-switching lower switch.

Another objective of the present disclosure is to provide a method of operating a Totem Pole power factor correction circuit to solve the problems of existing technology.

In order to achieve the above-mentioned objective, the preset disclosure provides a method of operating a Totem Pole power factor correction circuit, when converting a DC power to an AC power, the method includes steps of: generating a first control signal assembly with complementary levels to respectively control a fast-switching upper switch and a fast-switching lower switch of at least one fast-switching leg, generating a second control signal assembly with complementary levels to respectively control a slow-switching upper switch and a slow-switching lower switch of a slow-switching leg, and controlling the second control signal assembly to follow a phase angle of an AC voltage to dynamically adjust a duty cycle of the second control signal assembly to respectively turn on or turn off the slow-switching upper switch and the slow-switching lower switch.

With the proposed Totem Pole power factor correction (PFC) circuit and a method of operating the same, the features and advantages can be realized: 1. the existing Totem Pole circuit architecture, which is not suitable for the operation of the discharge mode in which the DC power supply is converted into the AC power supply, can be effectively applied to the operation of the single-phase and three-phase AC voltage of the electric vehicle by the dynamic angle control design; 2. the Totem Pole power factor correction circuit of the present disclosure can be applied to the operation of the full (wide) voltage range.

It is to be understood that both the foregoing general description and the following detailed description are exemplary, and are intended to provide further explanation of the present disclosure as claimed. Other advantages and features of the present disclosure will be apparent from the following description, drawings, and claims.

BRIEF DESCRIPTION OF DRAWINGS

The present disclosure can be more fully understood by reading the following detailed description of the embodiment, with reference made to the accompanying drawing as follows.

DETAILED DESCRIPTION

Reference will now be made to the drawing figures to describe the present disclosure in detail. It will be understood that the drawing figures and exemplified embodiments of present disclosure are not limited to the details thereof.

The present disclosure is a control structure for dynamically adjusting the angle of phase-locked AC voltage suitable for bidirectional Totem Pole power factor correction (PFC) circuit, which is not suitable for the operation of the discharge mode in which the DC power supply is converted into the AC power supply, can be effectively applied to the operation of the single-phase and three-phase AC voltage of the electric vehicle by the dynamic angle control design.

Figure 3:
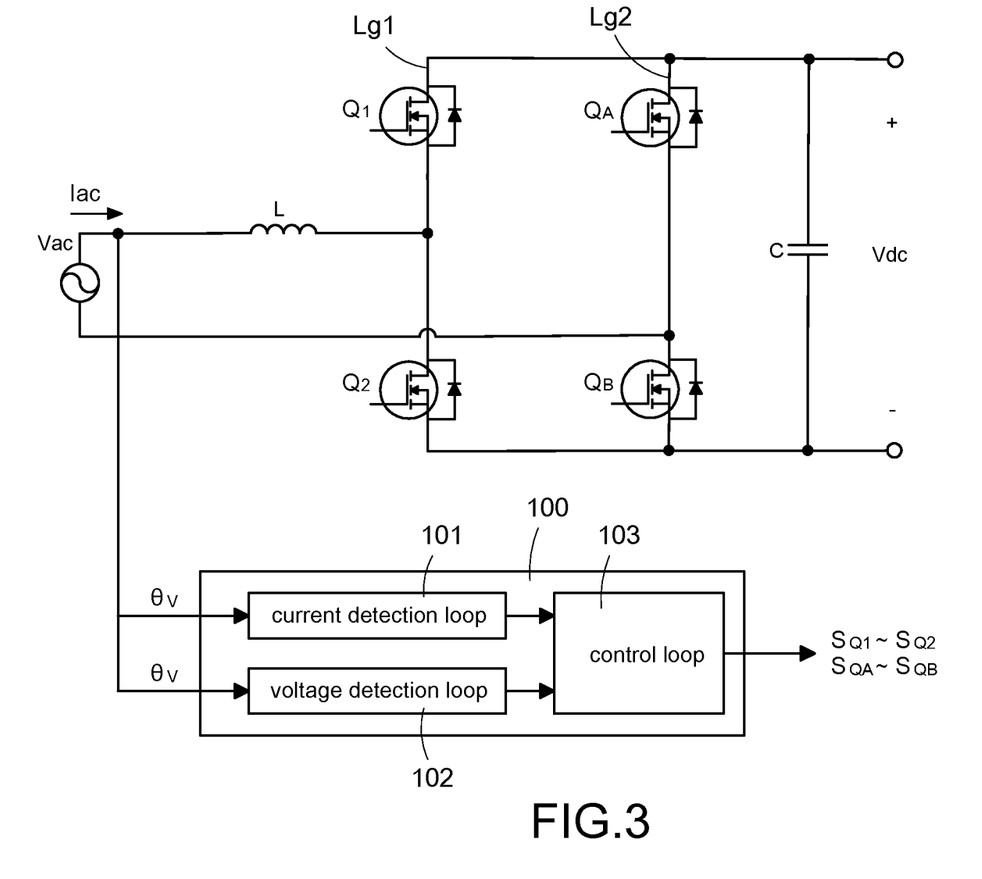
FIG. 3 is a block circuit diagram of a single-phase Totem Pole power factor correction circuit according to the present disclosure.
Figure 4:
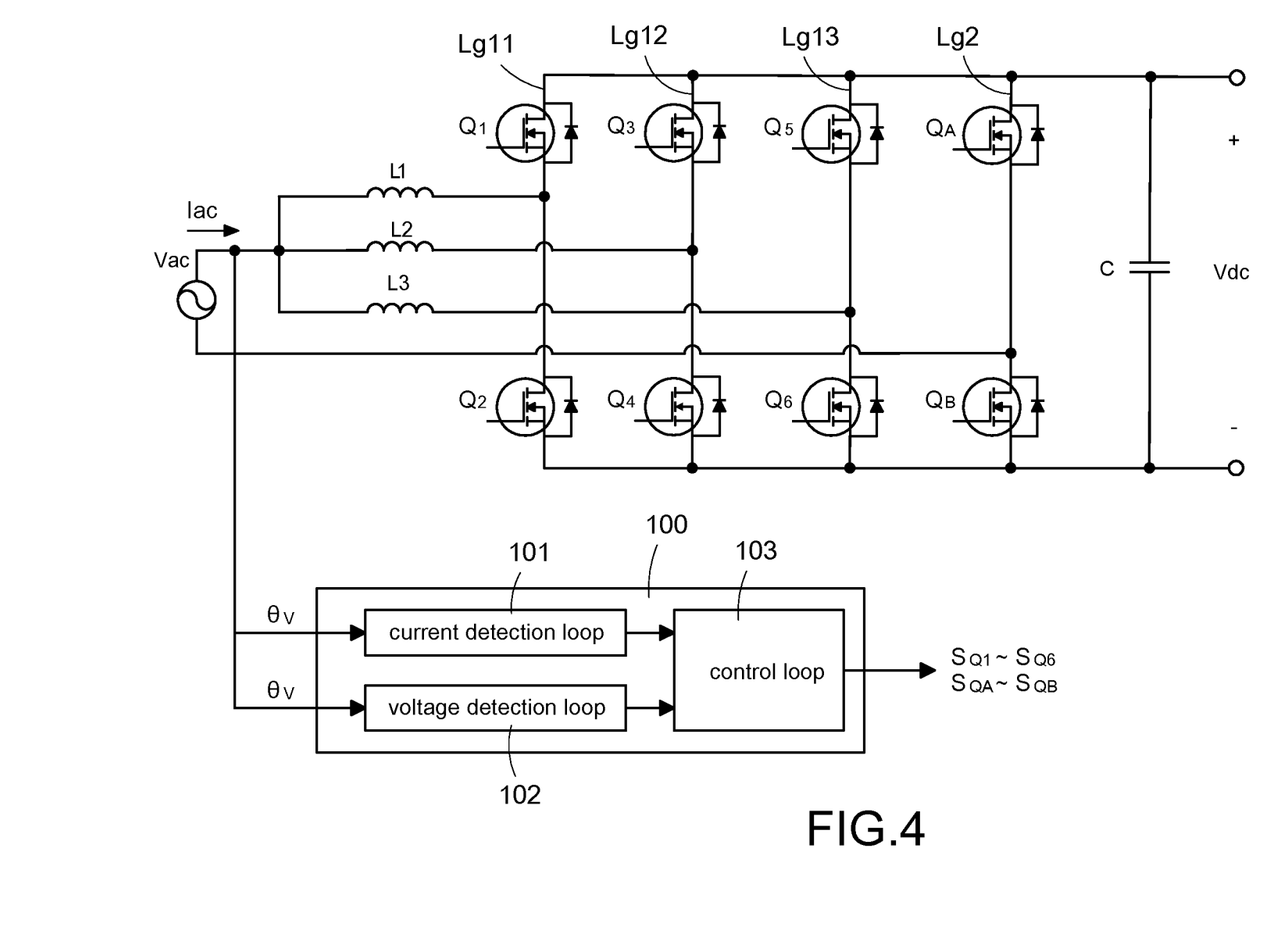
FIG. 4 is a block circuit diagram of a three-phase Totem Pole power factor correction circuit according to the present disclosure.

Please refer to FIG. 3 and FIG. 4, which show block circuit diagrams of a single-phase Totem Pole power factor correction circuit and a three-phase Totem Pole power factor correction circuit according to the present disclosure. The Totem Pole power factor correction circuit is used to convert an AC power to a DC power, and the Totem Pole power factor correction circuit includes at least one fast-switching leg, a slow-switching leg, and a control unit 100. In a single-phase structure shown in FIG. 3, the Totem Pole power factor correction circuit includes a fast-switching leg Lg1, a slow-switching leg Lg2, and a control unit 100. In a third-phase structure shown in FIG. 4, the Totem Pole power factor correction circuit includes three fast-switching legs Lg11-Lg13, that is, a first fast-switching leg Lg11, a second fast-switching leg Lg12, and a third fast-switching leg Lg13, a slow-switching leg Lg2, and a control unit 100.

As shown in FIG. 3, the fast-switching leg Lg1 includes a fast-switching upper switch $Q_1$ and a fast-switching lower switch $Q_2$. A common-connected end of the fast-switching upper switch $Q_1$ and the fast-switching lower switch $Q_2$ is coupled to an input inductor L, and is coupled to an AC voltage Vac through the input inductor L, that is, the fast-switching leg Lg1 is coupled to the AC voltage Vac through the input inductor L.

The slow-switching leg Lg2 is coupled to the fast-switching leg Lg1 in parallel, and the slow-switching leg Lg2 includes a slow-switching upper switch $Q_A$ and a slow-switching lower switch $Q_B$. The slow-switching leg Lg2 is directly coupled to the AC voltage Vac and is controlled by a frequency of the mains, i.e., a frequency of the AC voltage Vac.

As shown in FIG. 4, the first fast-switching leg Lg11 includes a first fast-switching upper switch $Q_1$ and a first fast-switching lower switch $Q_2$, the second fast-switching leg Lg12 includes a second fast-switching upper switch $Q_3$ and a second fast-switching lower switch $Q_4$, and the third fast-switching leg Lg13 includes a third fast-switching upper switch $Q_5$ and a third fast-switching lower switch $Q_6$. A common-connected end of the first fast-switching upper switch $Q_1$ and the first fast-switching lower switch $Q_2$ is coupled to a first input inductor L1, and is coupled to a first phase (for example, R phase) of the AC voltage Vac through the first input inductor L1. A common-connected end of the second fast-switching upper switch $Q_3$ and the second fast-switching lower switch $Q_4$ is coupled to a second input inductor L2, and is coupled to a second phase (for example, S phase) of the AC voltage Vac through the second input inductor L2. A common-connected end of the third fast-switching upper switch $Q_5$ and the third fast-switching lower switch $Q_6$ is coupled to a third input inductor L3, and is coupled to a third phase (for example, T phase) of the AC voltage Vac through the third input inductor L3. Therefore, the first fast-switching leg Lg11, the second fast-switching leg Lg12, and the third fast-switching leg Lg13 are respectively coupled to the AC voltage Vac through the first input inductor L1, the second input inductor L2, and the third input inductor L3.

The slow-switching leg Lg2 is coupled to the first fast-switching leg Lg11, the second fast-switching leg Lg12, the third fast-switching leg Lg13 in parallel, and the slow-switching leg Lg2 includes a slow-switching upper switch $Q_A$ and a slow-switching lower switch $Q_B$. The slow-switching leg Lg2 is directly coupled to the AC voltage Vac and is controlled by a frequency of the mains, i.e., a frequency of the AC voltage Vac.

In the single-phase structure shown in FIG. 3 and in the three-phase structure shown in FIG. 4, the control unit 100 receives an AC voltage Vac with a phase angle $\theta_V$. Specifically, the control unit 100 includes a current detection loop 101, a voltage detection loop 102, and a control loop 103. The current detection loop 101 receives the AC voltage Vac, and realizes the phase angle $\theta_V$ of the AC voltage Vac through a phase-locked loop PLL (referred in FIG. 5). Similarly, the voltage detection loop 102 receives the AC voltage Vac, and realizes the phase angle $\theta_V$ of the AC voltage Vac through the phase-locked loop PLL.

The control loop 103 is coupled to the current detection loop 101 and the voltage detection loop 102. The control loop 103 generates a first control signal assembly $S_{Q1}$, $S_{Q2}/S_{Q1}$~$S_{Q6}$ with complementary levels to respectively control the fast-switching upper switch $Q_1/Q_1$, $Q_3$, $Q_5$ and the fast-switching lower switch $Q_2/Q_2$, $Q_4$, $Q_6$, and generate a second control signal assembly $S_{QA}$, $S_{QB}$ with complementary levels to respectively control the slow-switching upper switch $Q_A$ and the slow-switching lower switch $Q_B$.

Therefore, in the single-phase structure as shown in FIG. 3, the first control signal assembly generated from the control loop 103 includes a fast-switching upper switch control signal $S_{Q1}$ and a fast-switching lower switch control signal $S_{Q2}$ to respectively control the fast-switching upper switch $Q_1$ and the fast-switching lower switch $Q_2$. The second control signal assembly generated from the control loop 103 includes a slow-switching upper switch control signal $S_{QA}$ and a slow-switching lower switch control signal $S_{QB}$ to respectively control the slow-switching upper switch $Q_A$ and the slow-switching lower switch $Q_B$.

Similarly, in the three-phase structure as shown in FIG. 4, the first control signal assembly generated from the control loop 103 includes fast-switching upper switch control signals $S_{Q1}$, $S_{Q3}$, $S_{Q5}$ and fast-switching lower switch control signals $S_{Q2}$, $S_{Q4}$, $S_{Q6}$ to respectively control the fast-switching upper switches $Q_1$, $Q_3$, $Q_5$ and the fast-switching lower switches $Q_2$, $Q_4$, $Q_6$. The second control signal assembly generated from the control loop 103 includes a slow-switching upper switch control signal $S_{QA}$ and a slow-switching lower switch control signal $S_{QB}$ to respectively control the slow-switching upper switch $Q_A$ and the slow-switching lower switch $Q_B$.

Figure 5:
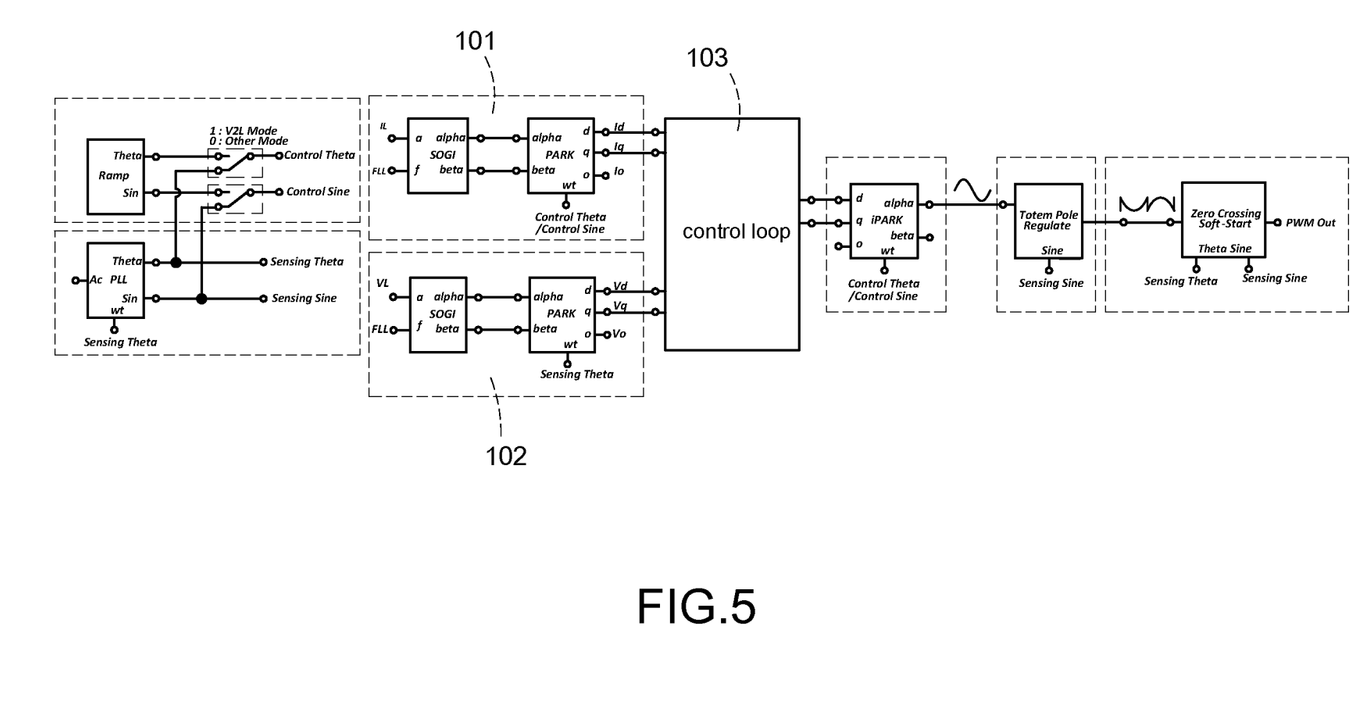
FIG. 5 is a block diagram of a control unit according to the present disclosure.
Figure 7:
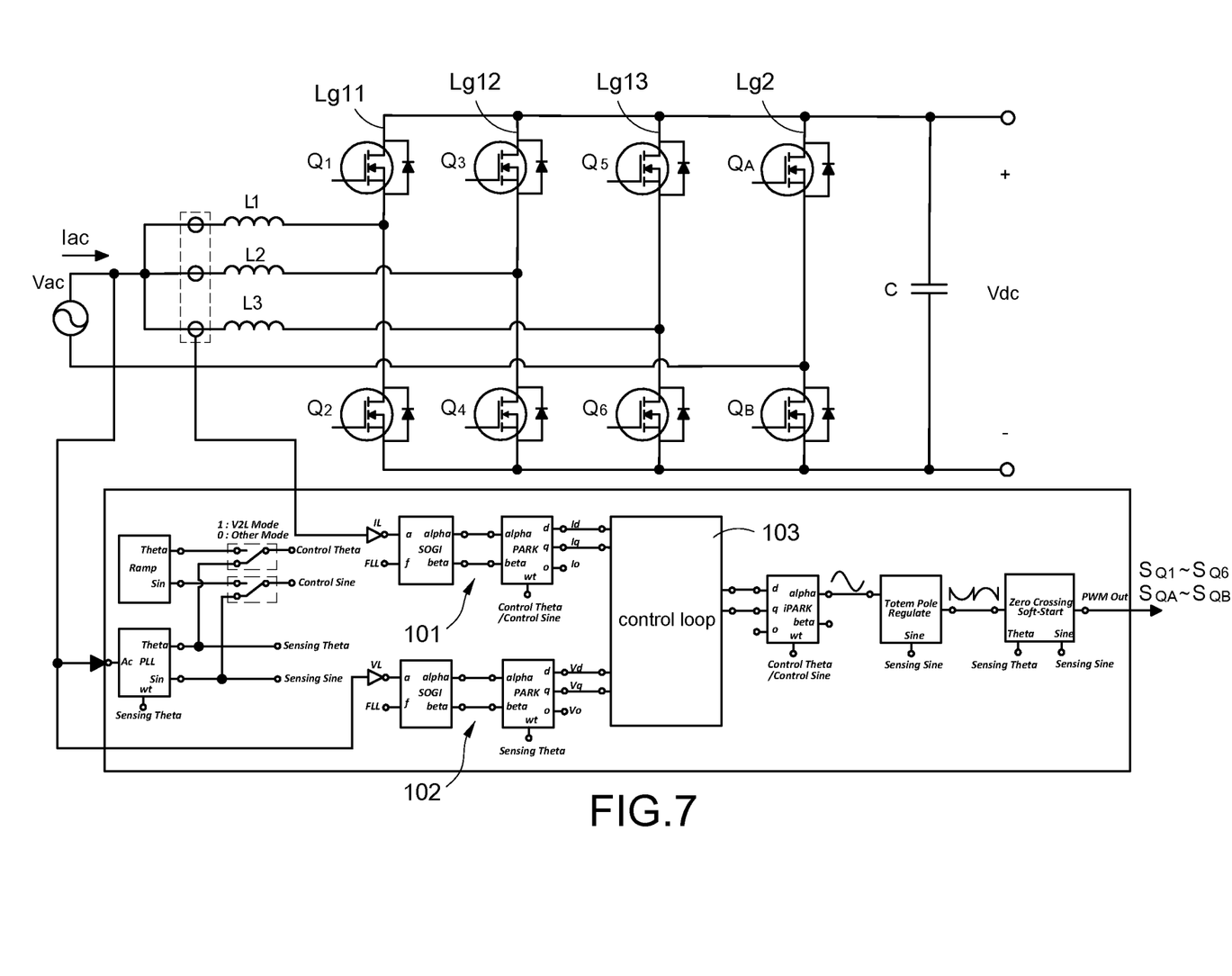
FIG. 7 is a specific block circuit diagram of FIG. 4.

Please refer to FIG. 5 and FIG. 7, which show a block diagram of a control unit according to the present disclosure, and a specific block circuit diagram of FIG. 4. The control loop 103 controls the second control signal assembly to follow the phase angle $\theta_V$ of the AC voltage Vac, and dynamically adjusts a duty cycle of the second control signal assembly to respectively turn on or turn off the slow-switching upper switch $Q_A$ and the slow-switching lower switch $Q_B$. Accordingly, the shift of the phase angle $\theta_V$ of the output voltage Vac is compensated due to the inductive or capacitive load, and the slow-switching upper switch $Q_A$ or the slow-switching lower switch $Q_B$ are locked in phase so that the existing Totem Pole circuit architecture, which is not suitable for the operation of the discharge mode in which the DC power supply is converted into the AC power supply, can be effectively applied to the operation of the single-phase and three-phase AC voltage of the electric vehicle by the dynamic angle control design.

As mentioned above, the control unit 100 receives the sinusoidal AC voltage Vac with the phase angle $\theta_V$, and the sinusoidal AC voltage Vac is analyzed into a theta or a unit sine through the phase-locked loop PLL for back-end control reference. As shown in FIG. 5, by receiving a theta value of the phase angle $\theta_V$ of the current detection loop 101 and the voltage detection loop 102 or converting the theta value into a unit sine value, and then controlled by the control loop 103, and then outputting a PWM (pulse-width modulation) signal through a Totem Pole regulator and a zero-cross soft-start unit to control a duty cycle of the switch. Therefore, when the phase of the AC voltage Vac is related to the inductive or capacitive load, the Totem Pole regulator is used to implement the phase-locked operation and provide the phase compensation (that is, the degree to which the phase angle shift of the output voltage Vac is compensated) to make the PWM signal be controlled in a safe (normal) mode so that the switch can be normally controlled and the energy can be normally transmitted to the AC side.

Figure 6:
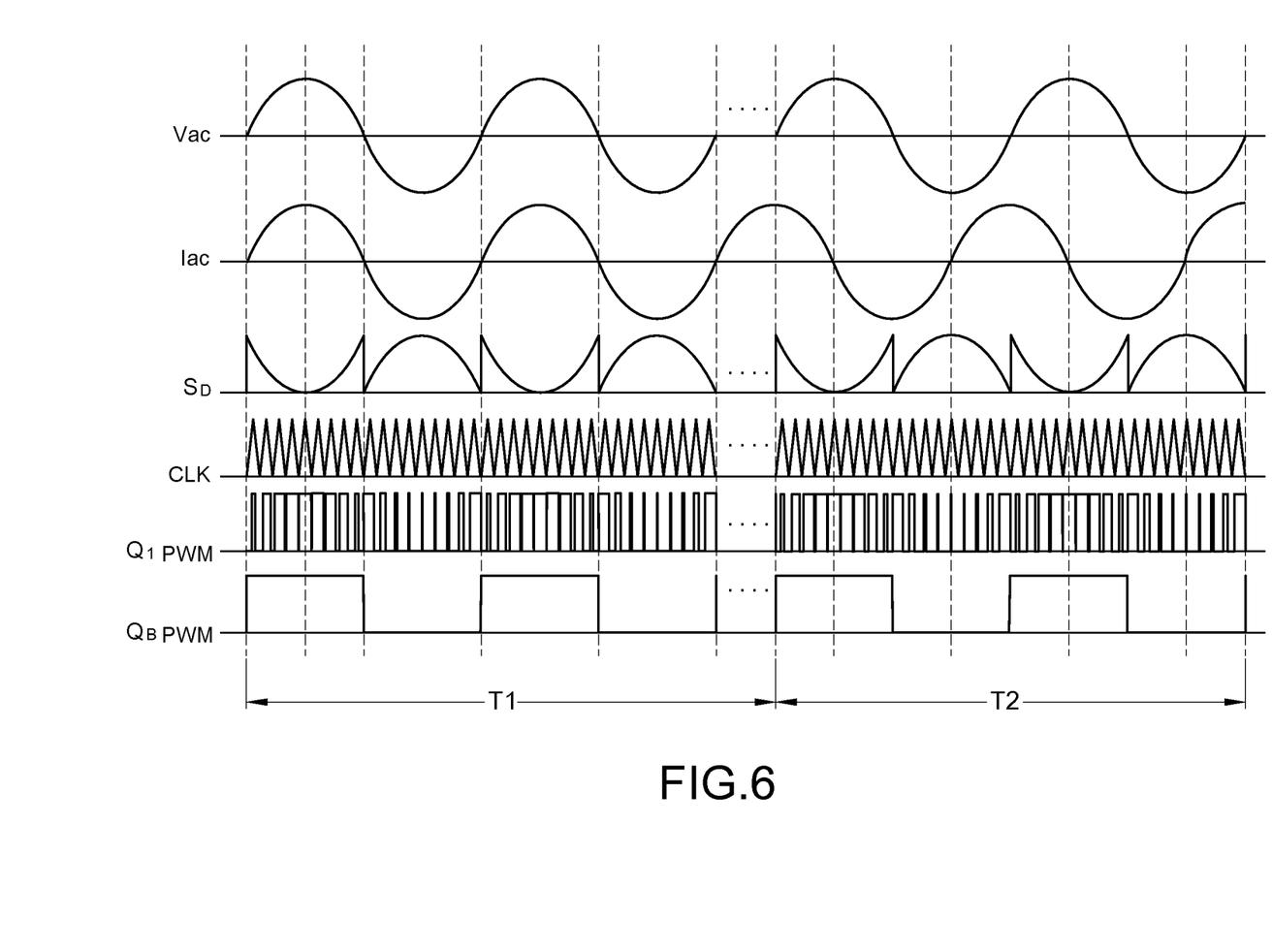
FIG. 6 is a waveform of control signals of controlling the Totem Pole power factor correction circuit according to the present disclosure.

Please refer to FIG. 6, which shows a waveform of control signals of controlling the Totem Pole power factor correction circuit according to the present disclosure. In comparison with FIG. 2, by using the control compensation mechanism of the Totem Pole power factor correction circuit, after the phase angle $\theta_V$ of the output voltage Vac is shifted, the control signal $Q_B$ PWM can still be maintained to provide normal switching control of the switch. Therefore, by controlling the control signal $Q_B$ PWM to follow the phase angle $\theta_V$ of the output voltage Vac, the duty cycle of the control signal of the slow-switching switches is dynamically adjusted. Under the operation as shown in FIG. 6, at the starting point of the T2 interval, the phase angle of the output voltage Vac should be 90 degrees originally. However, when the phase angle is shifted due to the inductive or capacitive load (as shown in FIG. 6, from the T1 interval to the T2 interval), the phase angle starts from 0 degree. Therefore, when the control signal $Q_B$ PWM follows the output voltage Vac from 0 degree in the positive half cycle, a duty cycle of a turned-on state or a high-level state is provided. That is, during the positive half cycle of the output voltage Vac, the turned-on state is continuously maintained. When the output voltage Vac enters the negative half cycle, the duty cycle of a turned-off state or a low-level state is provided. Accordingly, the duty cycle of the control signal $Q_B$ PWM is controllable so that the slow-switching upper switch $Q_A$ and the slow-switching lower switch $Q_B$ are used for a bridge rectification control.

In different operations, for example, at the starting point of the T2 interval, the phase angle of the output voltage Vac is 45 degrees due to angle shift. Therefore, when the control signal $Q_B$ PWM follows the output voltage Vac from 45 degrees in the positive half cycle, a duty cycle of a turned-on state or a high-level state is provided. That is, during the positive half cycle of the output voltage Vac, the turned-on state is continuously maintained. When the output voltage Vac enters the negative half cycle, the duty cycle of a turned-off state or a low-level state is provided. Accordingly, the duty cycle of the control signal $Q_B$ PWM is controllable so that the slow-switching upper switch $Q_A$ and the slow-switching lower switch $Q_B$ are used for a bridge rectification control.

In other words, when the AC voltage Vac is in the positive half cycle, the control loop 103 dynamically adjusts the duty cycle of the slow-switching upper switch control signal $S_{QA}$; when the AC voltage Vac is in the negative half cycle, the control loop 103 dynamically adjusts the duty cycle of the slow-switching lower switch control signal $S_{QB}$. Specifically, the control loop 103 dynamically adjusts the duty cycle of the slow-switching upper switch control signal $S_{QA}$ in the first positive half cycle after the phase angle $\theta_V$ is shifted, or the control loop 103 dynamically adjusts the duty cycle of the slow-switching upper switch control signal $S_{QB}$ in the first negative half cycle after the phase angle $\theta_V$ is shifted. Therefore, after the second positive half cycle or the second negative half cycle, duty cycles of the slow-switching upper switch control signal $S_{QA}$ and the slow-switching upper switch control signal $S_{QB}$ are maintained at 50% to respectively control the slow-switching upper switch $Q_A$ and the slow-switching lower switch $Q_B$.

In one embodiment, the control provides a Park's transformation operation to convert the time domain components of three-phase electrical coordinates (abc coordinates) into two-axis coordinates (dq coordinates) of orthogonal rotation, and therefore it can be used to convert AC current waveform and AC voltage waveform into DC signals to simplify calculations. For example, Parker transformation can project a-b-c three-phase AC voltage (AC voltage Vac) to the direct axis (d axis), the quadrature axis (q axis), and the zero axis (0 axis) perpendicular to the d-q plane of orthogonal rotation so as to convert AC current waveform and/or AC voltage waveform into DC signals to simplify calculations.

Figure 8:
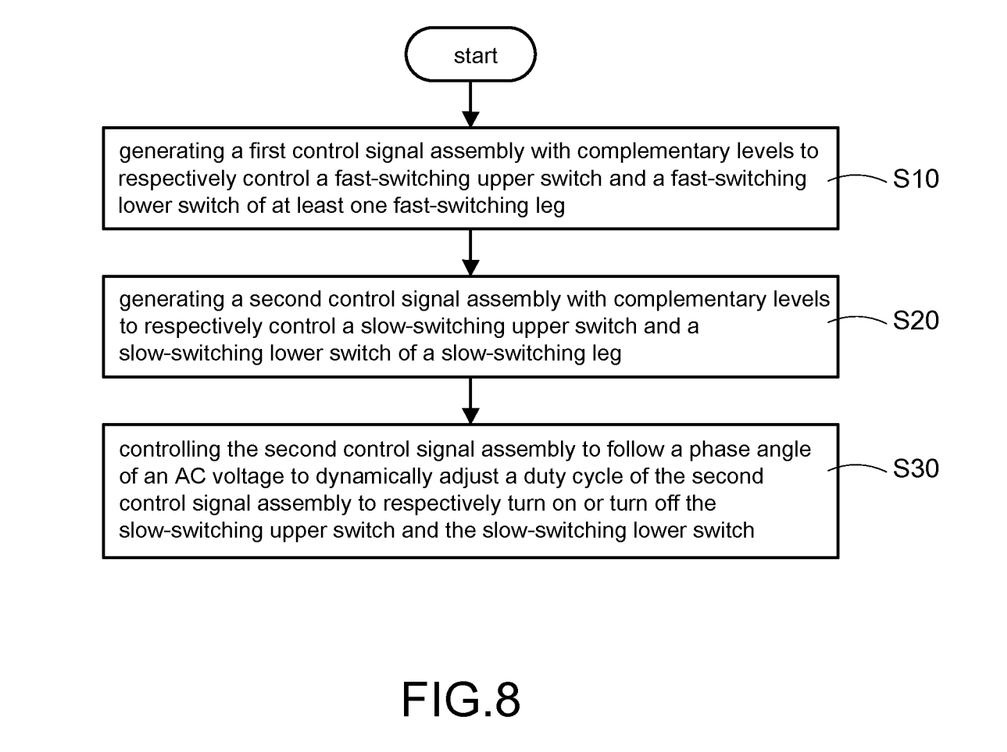
FIG. 8 is a method of operating the Totem Pole power factor correction circuit according to the present disclosure.

Please refer to FIG. 8, which shows a method of operating the Totem Pole power factor correction circuit according to the present disclosure. The Totem Pole power factor correction circuit includes at least one fast-switching leg, a slow-switching leg, and a control unit. For the specific circuit structure, reference may be made to the foregoing content, which will not be repeated here. The method includes the following steps of: first, generating a first control signal assembly with complementary levels to respectively control a fast-switching upper switch and a fast-switching lower switch of at least one fast-switching leg (S10). Afterward, generating a second control signal assembly with complementary levels to respectively control a slow-switching upper switch and a slow-switching lower switch of a slow-switching leg (S20). Finally, controlling the second control signal assembly to follow a phase angle of an AC voltage to dynamically adjust a duty cycle of the second control signal assembly to respectively turn on or turn off the slow-switching upper switch and the slow-switching lower switch (S30). Therefore, when a phase angle shift of the output voltage Vout occurs due to the inductive or capacitive load and the control signals of controlling the slow-switching upper switch and the slow-switching lower switch follow the output voltage Vac from 0 degree, 45 degrees, or other angles in the positive half cycle, a duty cycle of a turned-on state or a high-level state is provided. That is, during the positive half cycle of the output voltage Vac, the turned-on state is continuously maintained. When the output voltage Vac enters the negative half cycle, the duty cycle of a turned-off state or a low-level state is provided. Accordingly, the duty cycle of the control signal is controllable so that the slow-switching upper switch and the slow-switching lower switch are used for a bridge rectification control.

In summary, the present disclosure has the following features and advantages:

1. The control loop 103 controls the second control signal assembly to follow the phase angle $\theta_V$ of the AC voltage Vac to dynamically adjust the duty cycle of the second control signal assembly to respectively turn on or turn off the slow-switching upper switch $Q_A$ and the slow-switching lower switch $Q_B$. Accordingly, the shift of the phase angle $\theta_V$ of the output voltage Vac is compensated due to the inductive or capacitive load, and the slow-switching upper switch $Q_A$ or the slow-switching lower switch $Q_B$ are locked in phase so that the existing Totem Pole circuit architecture, which is not suitable for the operation of the discharge mode in which the DC power supply is converted into the AC power supply, can be effectively applied to the operation of the single-phase and three-phase AC voltage of the electric vehicle by the dynamic angle control design.

2. The Totem Pole power factor correction circuit of the present disclosure can be applied to the operation of the full (wide) voltage range.

Although the present disclosure has been described with reference to the preferred embodiment thereof, it will be understood that the present disclosure is not limited to the details thereof. Various substitutions and modifications have been suggested in the foregoing description, and others will occur to those of ordinary skill in the art. Therefore, all such substitutions and modifications are intended to be embraced within the scope of the present disclosure as defined in the appended claims.

What is claimed is:

1. A Totem Pole power factor correction circuit, when configured to convert a DC power to an AC power, comprising:
    at least one fast-switching leg, each fast-switching leg comprising a fast-switching upper switch and a fast-switching lower switch,
    a slow-switching leg, coupled to the at least one fast-switching leg in parallel, and the slow-switching leg comprising a slow-switching upper switch and a slow-switching lower switch, and
    a control unit, configured to receive an AC voltage with a phase angle, and the control unit comprising:
        a current detection loop, configured to receive the phase angle,
        a voltage detection loop, configured to receive the phase angle, and a control loop, coupled to the current detection loop and the voltage detection loop, and the control loop configured to generate a first control signal assembly with complementary levels to respectively control the fast-switching upper switch and the fast-switching lower switch, and generate a second control signal assembly with complementary levels to respectively control the slow-switching upper switch and the slow-switching lower switch, wherein the control loop controls the second control signal assembly to follow the phase angle, and dynamically adjusts a duty cycle of the second control signal assembly to respectively turn on or turn off the slow-switching upper switch and the slow-switching lower switch.

2. The Totem Pole power factor correction circuit as claimed in claim 1, wherein in a single-phase structure, the fast-switching leg comprises the fast-switching upper switch and the fast-switching lower switch; a common-connected end of the fast-switching upper switch and the fast-switching lower switch is coupled to an input inductor, and coupled to the AC voltage through the input inductor, wherein the slow-switching leg is coupled to the fast-switching leg in parallel, and the slow-switching leg comprises the slow-switching upper switch and the slow-switching lower switch.

3. The Totem Pole power factor correction circuit as claimed in claim 1, wherein in a three-phase structure, the fast-switching leg comprises a first fast-switching leg, a second fast-switching leg, and a third fast-switching leg; the first fast-switching leg comprises a first fast-switching upper switch and a first fast-switching lower switch, the second fast-switching leg comprises a second fast-switching upper switch and a second fast-switching lower switch, and the third fast-switching leg comprises a third fast-switching upper switch and a third fast-switching lower switch;

a common-connected end of the first fast-switching upper switch and the first fast-switching lower switch is coupled to a first input inductor, and coupled to a first phase of the AC voltage through the first input inductor; a common-connected end of the second fast-switching upper switch and the second fast-switching lower switch is coupled to a second input inductor, and coupled to a second phase of the AC voltage through the second input inductor; a common-connected end of the third fast-switching upper switch and the third fast-switching lower switch is coupled to a third input inductor, and coupled to a third phase of the AC voltage through the third input inductor;

wherein the slow-switching leg is coupled to the fast-switching leg in parallel, and the slow-switching leg comprises the slow-switching upper switch and the slow-switching lower switch.

4. The Totem Pole power factor correction circuit as claimed in claim 1, wherein when configured to convert the AC power to the DC power, the fast-switching upper switch and the fast-switching lower switch of each fast-switching leg configured as control switches for power factor correction, and the slow-switching upper switch and the slow-switching lower switch configured as control switches for bridge rectification.

5. The Totem Pole power factor correction circuit as claimed in claim 1, further comprising:

a phase-locked loop, configured to receive the AC voltage to perform a phase-locking control for the phase angle.

6. The Totem Pole power factor correction circuit as claimed in claim 1, wherein the second control signal assembly comprises a slow-switching upper switch control signal of controlling the slow-switching upper switch, and a slow-switching lower switch control signal of controlling the slow-switching lower switch, wherein when the AC voltage is in a positive half cycle, the control loop dynamically adjusts a duty cycle of the slow-switching upper switch control signal; when the AC voltage is in a negative half cycle, the control loop dynamically adjusts a duty cycle of the slow-switching lower switch control signal.

7. The Totem Pole power factor correction circuit as claimed in claim 6, wherein the control loop dynamically adjusts the duty cycle of the slow-switching upper switch control signal in the first positive half cycle after shifting the phase angle, or the control loop dynamically adjusts the duty cycle of the slow-switching lower switch control signal in the first negative half cycle after shifting the phase angle.

8. The Totem Pole power factor correction circuit as claimed in claim 1, wherein the control loop provides a Parker conversion operation to convert the AC voltage from a three-phase electrical coordinates to a two-axis coordinates.

9. The Totem Pole power factor correction circuit as claimed in claim 1, wherein the first control signal assembly and the second control signal assembly are pulse-width modulation signals.

10. The Totem Pole power factor correction circuit as claimed in claim 1, wherein the control unit further comprises:

a Totem Pole calibration unit, coupled to the control loop, and a zero-crossing soft-start unit, coupled to the Totem Pole calibration unit.

11. A method of operating a Totem Pole power factor correction circuit, when configured to convert a DC power to an AC power, comprising steps of:

generating a first control signal assembly with complementary levels to respectively control a fast-switching upper switch and a fast-switching lower switch of at least one fast-switching leg, generating a second control signal assembly with complementary levels to respectively control a slow-switching upper switch and a slow-switching lower switch of a slow-switching leg, and controlling the second control signal assembly to follow a phase angle of an AC voltage to dynamically adjust a duty cycle of the second control signal assembly to respectively turn on or turn off the slow-switching upper switch and the slow-switching lower switch.

12. The method of operating the Totem Pole power factor correction circuit as claim 11, wherein in a single-phase structure, the fast-switching leg comprises the fast-switching upper switch and the fast-switching lower switch; a common-connected end of the fast-switching upper switch and the fast-switching lower switch is coupled to an input inductor, and coupled to the AC voltage through the input inductor, wherein the slow-switching leg is coupled to the fast-switching leg in parallel, and the slow-switching leg comprises the slow-switching upper switch and the slow-switching lower switch.

13. The method of operating the Totem Pole power factor correction circuit as claim 11, wherein in a three-phase structure, the fast-switching leg comprises a first fast-switching leg, a second fast-switching leg, and a third fast-switching leg; the first fast-switching leg comprises a first fast-switching upper switch and a first fast-switching lower switch, the second fast-switching leg comprises a second fast-switching upper switch and a second fast-switching lower switch, and the third fast-switching leg comprises a third fast-switching upper switch and a third fast-switching lower switch;

a common-connected end of the first fast-switching upper switch and the first fast-switching lower switch is coupled to a first input inductor, and coupled to a first phase of the AC voltage through the first input inductor; a common-connected end of the second fast-switching upper switch and the second fast-switching lower switch is coupled to a second input inductor, and coupled to a second phase of the AC voltage through the second input inductor; a common-connected end of the third fast-switching upper switch and the third fast-switching lower switch is coupled to a third input inductor, and coupled to a third phase of the AC voltage through the third input inductor;

wherein the slow-switching leg is coupled to the fast-switching leg in parallel, and the slow-switching leg comprises the slow-switching upper switch and the slow-switching lower switch.

14. The method of operating the Totem Pole power factor correction circuit as claim 11, wherein the second control signal assembly comprises a slow-switching upper switch control signal of controlling the slow-switching upper switch, and a slow-switching lower switch control signal of controlling the slow-switching lower switch, wherein when the AC voltage is in a positive half cycle, a control loop dynamically adjusts a duty cycle of the slow-switching upper switch control signal; when the AC voltage is in a negative half cycle, the control loop dynamically adjusts a duty cycle of the slow-switching lower switch control signal.

15. The method of operating the Totem Pole power factor correction circuit as claim 14, wherein the control loop dynamically adjusts the duty cycle of the slow-switching upper switch control signal in the first positive half cycle after shifting the phase angle, or the control loop dynamically adjusts the duty cycle of the slow-switching lower switch control signal in the first negative half cycle after shifting the phase angle.

* * * * *